(12) United States Patent
Crary et al.

(10) Patent No.: US 7,188,610 B2
(45) Date of Patent: Mar. 13, 2007

(54) NO-RETURN LOOP FUEL SYSTEM

(75) Inventors: Lynwood F. Crary, Preston, CT (US);
John R. Forgue, Cheshire, CT (US);
Mark R. Johansen, Wallingford, CT (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 212 days.

(21) Appl. No.: 10/946,953

(22) Filed: Sep. 22, 2004

(65) Prior Publication Data

US 2005/0034710 A1   Feb. 17, 2005

Related U.S. Application Data

(63) Continuation-in-part of application No. 10/766,393, filed on Jan. 28, 2004, which is a continuation-in-part of application No. 10/443,159, filed on May 22, 2003, now abandoned.

(60) Provisional application No. 60/390,377, filed on Jun. 21, 2002.

(51) Int. Cl.
*F02M 69/54* (2006.01)
*F02M 37/00* (2006.01)

(52) U.S. Cl. ....................... 123/457; 123/511

(58) Field of Classification Search ................ 123/457, 123/458, 510, 511, 497
See application file for complete search history.

(56) References Cited

U.S. PATENT DOCUMENTS 5,265,644 A * 11/1993 Tuckey ..................... 137/510
5,339,785 A * 8/1994 Wilksch ..................... 123/457
5,361,742 A * 11/1994 Briggs et al. ............... 123/506
5,398,655 A * 3/1995 Tuckey ...................... 123/456
5,477,829 A 12/1995 Hassinger et al.
5,579,739 A * 12/1996 Tuckey et al. .............. 123/467

(Continued)

Primary Examiner—Thomas Moulis
(74) Attorney, Agent, or Firm—Reising, Ethington, Barnes, Kisselle, P.C.

(57) ABSTRACT

A no-return loop fuel injection system supplies fuel from a fuel pump to an injector fuel rail, through a fuel line. A biased closed pressure control valve communicates with the fuel line and has a valve head preferably of a diaphragm type carrying a fuel side having first and second areas which are segregated and defined by a valve seat when the pressure control valve is closed. An opposite second side of the pressure control valve is exposed to a reference pressure and a closure biasing force. The pressure control valve opens when a hydraulic opening force induced by a fuel pressure exerted upon the first area, plus a fuel pressure exerted upon the second area, is greater than the net reference pressure and closure biasing forces. Preferably, the first area is smaller than the second area, thus manipulating the effects of the fuel pressures exerted upon the first and second areas with respect to opening the valve. When the pressure control valve is open, the system operating pressure exposed to both the first and second areas is sufficient to produce the hydraulic force necessary to keep the valve open. Preferably, the pressure control valve is part of a pressure valve assembly of a fuel pump module located inside a fuel tank. The pressure valve assembly preferably has a flow check valve orientated in a parallel flow configuration to the pressure control valve when the fuel pump is of a variable speed type, or, for systems utilizing constant speed pumps the check valve is replaced with a flow bypass orifice.

73 Claims, 6 Drawing Sheets

U.S. PATENT DOCUMENTS

| | | |
|---|---|---|
| 5,619,972 A | 4/1997 | Kuenzli et al. |
| 5,673,670 A | 10/1997 | Powell et al. |
| 5,727,529 A | 3/1998 | Tuckey |
| 5,785,080 A * | 7/1998 | Herbst .................. 137/510 |
| 5,873,349 A | 2/1999 | Tuckey et al. |
| 5,967,120 A | 10/1999 | Blanton et al. |
| 6,039,030 A | 3/2000 | Robinson et al. |
| 6,135,092 A * | 10/2000 | Schaenzer et al. ......... 123/456 |
| 6,155,235 A | 12/2000 | Kilgore |
| 6,286,486 B1 | 9/2001 | Robinson et al. |
| 6,296,012 B1 * | 10/2001 | Kilgore et al. ............. 137/468 |
| 2003/0056769 A1 | 3/2003 | McGrath et al. |

* cited by examiner

NO-RETURN LOOP FUEL SYSTEM

REFERENCE TO RELATED APPLICATION

Applicant claims the benefit of each of CIP application Ser. No. 10/766,393, filed Jan. 28, 2004; which claims the benefit of parent non-provisional application Ser. No. 10/443,159, filed May 22, 2003 now abandoned and published Dec. 25, 2003; which claims the benefit of provisional application Ser. No. 60/390,377, filed Jun. 21, 2002.

FIELD OF THE INVENTION

This invention relates to automotive engine fuel systems and more particularly to a no-return loop fuel system having a variable speed fuel pump and a pressure valve assembly.

BACKGROUND OF THE INVENTION

There are two general types of no-return loop or returnless fuel injection systems for a combustion engine. The first type, referred to as a "T" configuration, is used in fuel system applications where the fuel pressure within an injector fuel rail is held constant regardless of the mass fuel amount flowing through the injectors. The second type is referred to as a "parallel" configuration and is particularly popular in fuel systems requiring varying fuel pressure within the injector fuel rail dependent upon a particular engine transient. For instance, turbo-charged engines often require injector fuel rail pressures at wide open throttle conditions which are twice that at idle or engine coasting conditions. Both types commonly utilize a cycling or variable speed fuel pump which varies and controls fuel pressure via a pressure signal generated at the fuel rail.

The "T" configuration 10, as best shown in FIG. 1 as prior art, supplies fuel to an injector fuel rail 12 through a flow check valve 14 at the outlet of a variable speed fuel pump 16. The flow check valve 14 will close when fuel pressure at the valve outlet exceeds the fuel pressure at the valve inlet or pump outlet 18. The flow check valve 14 will typically close when the engine is shut-off, thereby, preventing fuel vaporization and preserving liquid fuel and pressure within the rail 12 for reliable engine start-up. Orientated between the flow check valve 14 and the fuel rail 12 of the "T" configuration 10 is a pressure relief check valve 19 for bleeding fuel directly back to the fuel tank in the event the fuel rail and injectors are subject to an overpressure condition. The pressure relief check valve 19 is designed to typically open when fuel pressure at the fuel rail 12 or inlet 17 of the pressure relief check valve 19 exceeds a predetermined value which is higher than the normal operating pressure at the fuel rail 12.

For instance, an overpressure condition may be caused after engine shutdown, wherein the flow check valve 14 is closed and the resultant trapped fuel within the fuel rail 12 rises in pressure with increasing fuel temperature, possibly heated by the residual heat emanating from the hot engine or surrounding environment. Yet another scenario of an overpressure condition may be caused by a slow response time of the variable speed pump. For instance, when an engine running at wide open throttle is immediately decelerated into a coasting condition, the injectors may thus close for seconds at a time. This could cause a pressure spike if the variable speed fuel pump can not immediately respond thus the pressure relief check valve will open to relieve fuel pressure at the rail.

Unfortunately, because the pressure relief check valve is referenced to tank pressure as opposed to pump output pressure, the relief set pressure of the "T" configuration utilizing a variable speed fuel pump must be set well above system operating pressure. As a result, the range of pressure control within the fuel rail is limited and the fuel injectors exposed to higher fuel pressure are more likely to leak when the engine is shut-down. A second disadvantage of the typical "T" configuration is that a separate bypass line and associated fittings are required thus increasing the manufacturing costs and assembly required. The previously described "T" configuration also has a disadvantage of returning fuel overage directly to the fuel tank which may result, particularly under high temperature conditions, in the fuel pump continuously pumping fuel through the pressure relief check valve and back into the fuel tank.

Another known aspect of the "T" configuration fuel system utilizes a constant speed fuel pump in place of the variable speed pump previously described. To control fuel pressure, typically at about 300 kPa operating pressure for a typical engine application, the constant speed system utilizes a pressure regulation valve in place of the pressure relief valve 19 of the variable speed system. Unfortunately, when the engine is shutdown and the fuel system remains pressurized at operating pressure, any increase in ambient temperatures (i.e. residual heat from a hot engine) will cause the trapped fuel to rise in pressure. This rise immediately causes the pressure regulation valve to open emitting a controlled amount of fuel from the system to lower fuel pressure. Should ambient temperatures decrease, the system pressure of the trapped fuel will fall substantially below system operating pressure. Subsequently, any further fuel temperature increases in the system or fuel rail at the lower pressures will produce vapor in the system. When starting the engine, the regulation valve will open preventing the fuel rail from exceeding, even for a limited period of time, the relatively low system operating pressure (i.e. 300 kPa). Consequently, without some degree of a pressure spike during engine starts, the vapor will not collapse back into liquid fuel and a prolonged or rough engine start will result.

The second or "parallel" configuration, as disclosed in U.S. Pat. No. 5,361,742 (Briggs et al.) and U.S. Pat. No. 5,477,829 (Hassinger et al.), which is probably the most current type of fuel injection system, also utilizes a variable speed fuel pump which varies speed and thus fuel flow based on a fuel pressure input signal from the fuel rail. Unlike the "T" configuration, the "parallel" configuration utilizes a flow check valve and a pressure relief check valve orientated in parallel to one another at the outlet of the pump. During operation of a combustion engine employing the "parallel" configuration of the no-return loop fuel injection system, the flow check valve at the outlet of the fuel pump opens with minimal differential pressure when fuel is supplied to the fuel injector rail, and closes to prevent reverse flow of fuel when the pressure at the flow check valve outlet (or pressure at the rail) is greater than the outlet pressure at the pump (or inlet pressure to the flow check valve). If the pressure at the outlet of the flow check valve exceeds a predetermined value referenced to the outlet of the pump usually during long deceleration periods, the parallel pressure relief check valve will open and fuel will reverse flow through the idle pump. To reduce this excessive fuel pressure at the rail, the normally closed pressure relief check valve opens from a normally closed position while the flow check valve remains closed. The pressure relief setpoint is greater than that of the flow check valve, protects the fuel rail from over-pressurization, and prevents fuel in the rail from vaporizing during engine shut down. When the pressure relief check valve is open, fuel bleeds back from the fuel rail and through the outlet side of the fuel pump. This "parallel" configuration contrasts with the pressure relief check valve of the "T" configuration where the opening setpoint pressure of the pressure relief check valve is above the maximum running pressure of the fuel rail and the fuel bleed back is not through the fuel pump.

Unfortunately, the parallel combination of the pressure relief check valve and the flow check valve requires many moving parts and thus is expensive to manufacture and maintain. Moreover, both valves are typically of a poppet design. The flow check valve has a ball bearing as a head which engages a seat under its own weight when closed. The pressure relief check valve is similar but typically is assisted by the force of a spring to further bias the ball bearing against the seat. Unfortunately, poppet valves are prone to wear and high frequency pressure fluctuations, as best shown in FIG. 7, which can degrade the smooth running performance of an engine.

SUMMARY OF THE INVENTION

A no-return loop fuel injection system supplies fuel from a fuel pump to an injector fuel rail, through a fuel line. Communicating with the fuel line is a biased closed pressure control valve having a valve head preferably of a diaphragm type with a fuel side having first and second areas segregated from one-another by a valve seat when the pressure control valve is closed. An opposite second side of the valve head is exposed to a reference pressure and a closure force to produce a net closure biasing force. To open the pressure control valve, the combined hydraulic opening force induced by the fuel pressure or exerted upon the first area, plus the pressure of fuel exerted upon the second area, must be greater than the net closure biasing force. Preferably, the first area is smaller than the second area, hence to achieve the necessary hydraulic force to open the valve, the pressure of fuel generally exposed to the first area is greater than the necessary pressure of fuel exposed to the second area. When the pressure control valve is open, the system operating pressure of fuel exposed to both the first and second areas is high enough to produce the hydraulic force necessary to keep the valve open.

Preferably, the pressure control valve is part of a pressure valve assembly of a fuel pump module located inside a fuel tank. The pressure valve assembly preferably has a flow check valve orientated in a parallel flow configuration to the pressure control valve when the fuel pump is of a variable speed type. However, when the fuel pump is of a constant speed type, the flow check valve is preferably replaced with a flow bypassing orifice.

In one preferred aspect of the no-return loop fuel injection system, a turbine-type fuel pump supplies fuel to an injector fuel rail, directly through the pressure control valve of the pressure valve assembly which is also capable of flowing fuel from the rail and back through the pump to relieve rail fuel pressure. Preferably, the diaphragm-type valve head is biased closed via a spring disposed within a reference chamber defined between a housing and the reference side of the diaphragm and vented to the atmosphere. A fuel chamber defined between the opposite fuel side of the diaphragm and a valve body communicates between a pump-side port and a rail-side port. With the control valve in a closed position, the fuel chamber is divided into a rail sub-chamber and a pump sub-chamber via the sealing relationship between the valve seat and the diaphragm, held closed by the closure biasing force of a spring. The second area of the diaphragm defines in-part the pump sub-chamber, and the first area of the diaphragm defines in part the rail sub-chamber of the fuel chamber.

Preferably, when the pressure control valve is two-way flowing and the fuel pump is variable speed, the pressure valve assembly also includes an integral flow check valve orientated in a parallel configuration to the pressure control valve. The flow check valve assists in engine starts when battery voltage is lower such as in cold weather, and output of the fuel pump is degraded, and prevents vapor lock caused by the cool-down process of a non-running engine. The flow check valve opens upon a relatively small differential pressure to flow fuel from the fuel pump to the injector rail when pump output pressure is less than that required to open the pressure control valve. The flow check valve will also open upon the same differential pressure when the engine and pump are not running and the pressure of trapped fuel within the fuel rail reduces to sub-atmospheric conditions due to cooling, and thus inhibiting fuel vapor lock at the fuel rail. Preferably, the variable speed fuel pump is controlled via a computer receiving an input from a pressure transducer at the rail. Preferably, the closure biasing force is substantially equal to the minimum or idling fuel pressure at the rail times the area of the inner area of the diaphragm.

A second aspect of the invention utilizes a constant speed fuel pump in a novel "T" configuration fuel system utilizing a pressure regulator which returns fuel to the tank at operating pressures. With this configuration, the pressure valve assembly is located immediately upstream of the pressure regulator on a diversion line which tees into the fuel line and acts to "spike" fuel pressure during engine starts which collapses any accumulated vapor formed in the system during extended engine shut-down periods providing quick engine starts. Preferably, when the fuel system is a "T" configuration and the constant speed fuel pump is utilized, the pressure valve assembly utilizes a flow bypass orifice to equalize fuel pressure on both sides of the pressure control valve and relieve pressure at the rail should the control valve prematurely close during a thermal soak period.

Objects, features and advantages of this invention are to provide a no-return loop fuel system which utilizes a reverse flowing valve assembly to control fuel pressure delivered to the injectors during various engine operating conditions and preserve fuel pressure within the system at a minimal value during engine shut down. The system avoids supplying excessive fuel to the engine under certain operating conditions, decreases engine emissions, improves engine start-up during low voltage scenarios, prevents fuel vapor lock at the fuel rail, decreases the number of parts, and is rugged, durable, maintenance free, of relatively simple design and economical manufacture and assembly, and in service has a long useful life.

DESCRIPTION OF THE DRAWINGS

These and other objects, features and advantages of this invention will be apparent from the following detailed description, appended claims, and accompanying drawings in which:

DETAILED DESCRIPTION OF THE PREFERRED EMBODIMENTS

Figure 2:
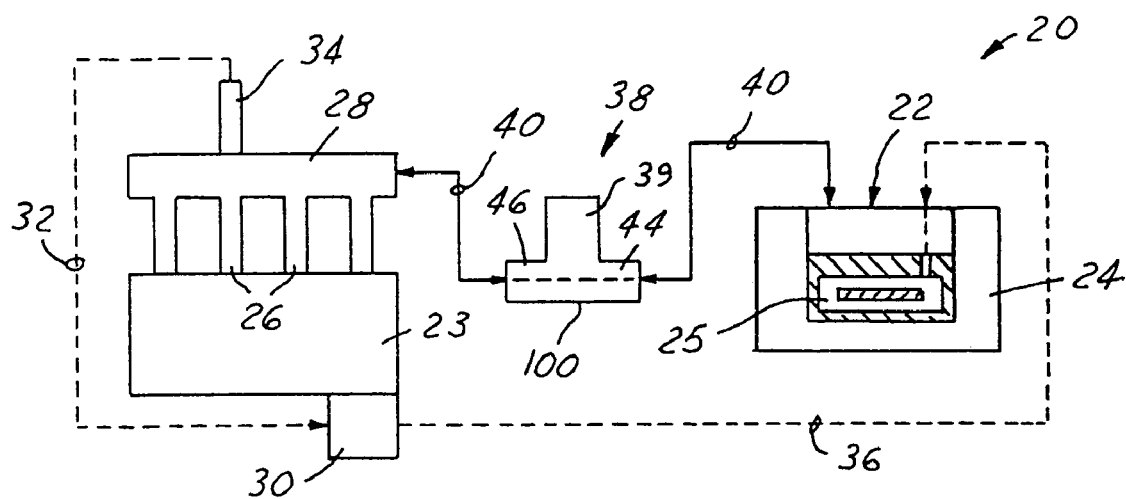
FIG. 2 is a schematic of a no-return loop, "parallel" configuration fuel injection system of the present invention.

As best illustrated in FIG. 2 a no-return loop fuel system 20 of the present invention has a variable speed turbine fuel pump 22 preferably disposed within a fuel tank 24 which delivers fuel to a series of injectors 26 to operatively deliver fuel from a common manifold tube or fuel rail 28 to respective combustion chambers of an engine 23. The speed of the fuel pump 22 is controlled via a computer or a controller 30 (preferably part of the vehicle engine central processing unit) which receives an input signal 32 from a pressure transducer 34 mounted on the fuel rail 28 which then processes the signal and outputs a speed control signal 36 to the pump 22. Preferably, the pressure at the fuel rail 28 varies depending upon engine speed or consumption demand and any other of a variety of engine parameters processed by the controller 30.

A pressure valve assembly 38 has a pressure relief, regulator, or control valve 39 interposed in a fuel line 40 communicating between the fuel pump 22 and the fuel rail 28 of the engine 23. Pressure relief valve 39 is not a check valve and is capable of fuel flow in either direction, thus a conventional return fuel line for reducing pressure at the rail or any point in-between is not required. When relief valve 39 is in a closed position 42 (FIG. 5), a pump-side passage or port 44 of the pressure valve assembly 38 is generally isolated from an engine-side or rail-side passage or port 46 of the assembly. When the pressure relief valve 38 is in an open position 48 (FIG. 3), fuel may flow in either direction through the valve assembly, depending on the needs of the fuel system 20.

Prior to starting of the engine 23 on a relatively mild temperature day, residual fuel pressure within the fuel rail 28 should be near or substantially below idling pressure, while during engine idle operation the fuel rail 28 idling pressure is controlled by varying the speed of the fuel pump 22. However, any fuel pressure increase of the trapped fuel within the rail caused by residual heat from the engine exhaust manifold or heat generated within the engine compartment, caused for instance by the vehicle standing exposed to the heat of a hot day, is relieved by the pressure relief valve 39 opening to flow fuel from the rail and back through an impeller cavity 25 of the pump 22 and to the fuel tank. To move from the closed position 42 to the open position 48, the force exerted by the residual fuel pressure at the rail-side port 46 must exceed the closure biasing force F of the valve 38 which holds the valve normally closed if the fuel pressure at the pump-side port 44 is at atmospheric or reference pressure. Otherwise, positive residual fuel pressure at the pump-side port 44, even though its less than the residual pressure at the rail-side port 46, will assist to open the valve 38 to relieve fuel pressure at the rail 28.

Figure 3:
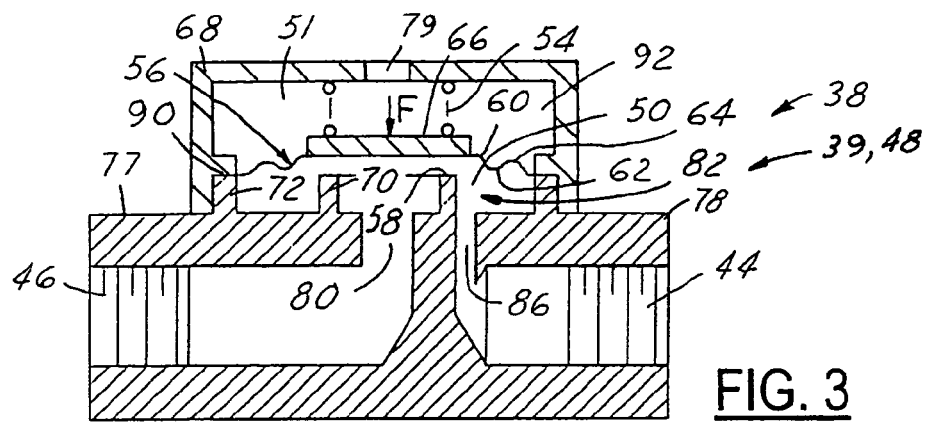
FIG. 3 is a semi-schematic cross section of a pressure relief valve of the no-return loop fuel injection system shown in an open position.
Figure 4:
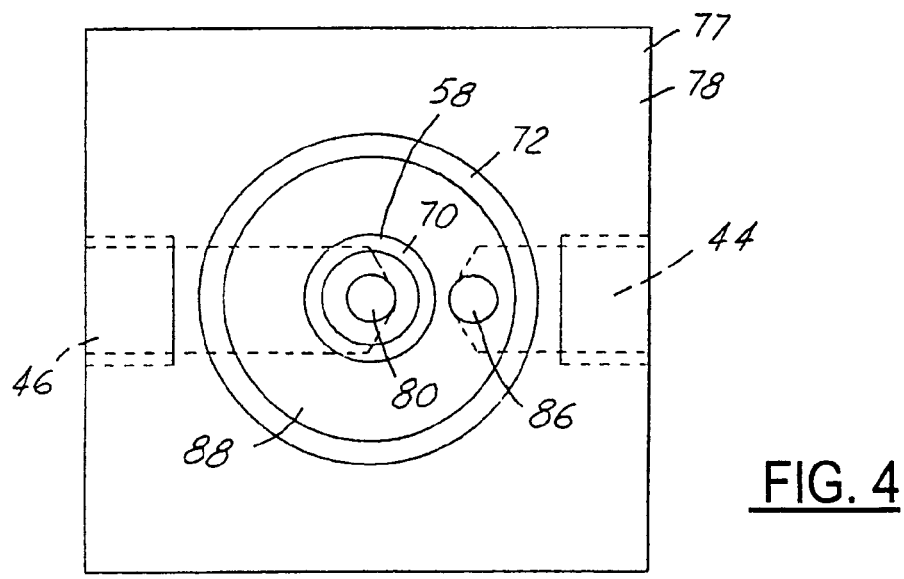
FIG. 4 is a semi-schematic plan view of the pressure relief valve with portions removed to show internal detail.
Figure 5:
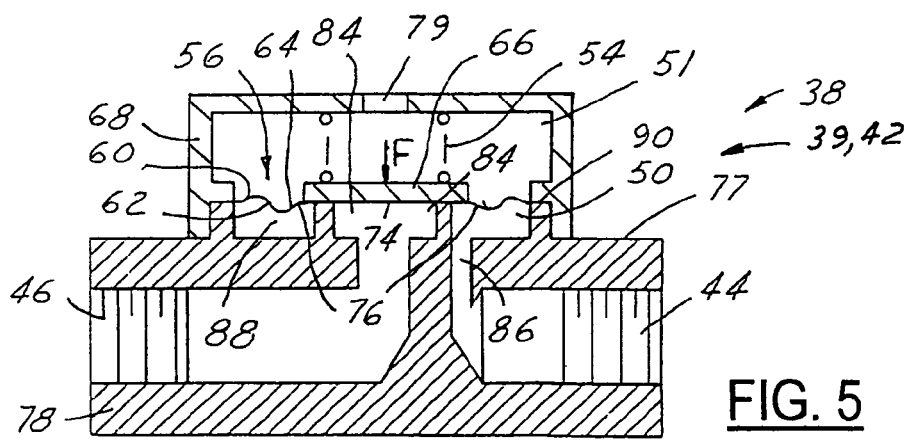
FIG. 5 is a semi-schematic cross section of the pressure relief valve similar to FIG. 3 except the valve is shown in a closed position.

Referring to FIGS. 3–5, when the engine 23 is first started, the pump 22 begins to flow supply fuel, and the injectors 26 begin to cycle open. The pump-side port pressure will surge to meet the fuel demand of the cycling open injectors 26. The force exerted by the surging fuel pressure at the pump-side port 44 coupled with the force exerted by the residual fuel pressure at the rail-side port 46, will open the valve 38 once the combined forces exceed the biasing force F of the valve 39. Once the engine 23 is started, and with the fuel relief valve 39 open, the speed of the pump 22 will adjust or level-off to maintain idling or minimum fuel pressure at the rail 28 assuming the engine is at idling condition.

For enhanced fuel systems, during start-up, the fuel injectors 26 will not begin to cycle open until the fuel pressure within the fuel rail reaches minimum idling pressure. Therefore, the pump 22 will initiate first, and the injectors 26 will cycle open only after idle operating pressure is reached at the rail 28. This sequencing is especially preferable when hot fuel trapped within the rail 28 has been relieved of pressure through the fuel relief valve 38 to idling pressure and then the fuel cools dropping further in pressure to a reduced residual pressure, well below necessary idling pressure, thus requiring more time for the pump 22 to restore fuel pressure to idle operation levels before injector cycling. Any fuel leakage through the injectors can only aggravate this condition by dropping the residual pressure even further. In any event, the residual fuel pressure within the rail 28 theoretically remains high enough to prevent the vaporization of fuel or air ingress into the fuel rail which could hinder start-up and cause rough idling conditions. Similarly, for enhanced fuel systems, during start-up, the area of the valve 39 which communicates with the rail 28 and the area of the valve 39 that communicates with the pump 22 can be sized and the biasing force F can be specified such that the fuel pressure maintained in the fuel rail when the engine 23 is off is equal to or higher than idle operating pressure. This condition minimizes the generation of vapor in the fuel rail 28 during hot-fuel, engine-off, conditions.

Preferably, as the engine speed increases, fuel flow increases and the required fuel pressure within the fuel rail 28 increases. This increase in pressure is especially true for turbo-charged engines where the rail pressure at wide open throttle conditions is typically approximately twice the required rail pressure at idle. When an engine is running at wide open throttle conditions and is suddenly decelerated to a coasting engine condition, the injectors 26 may remain suddenly closed for seconds at a time. Although the fuel pump 22 may effectively stop, high fuel pressures within the rail must still be relieved to substantially reduce rail pressure to idling pressures. Excessive heat from the engine 23 will aggravate this overpressure condition by heating the trapped fuel. Therefore, fuel must flow from the rail through the open pressure relief valve 39 of the pressure valve assembly 38, and back through the impeller cavity 25 of the idle pump 22. The reaction time for this pressure drop scenario is believed to be quick because the pressure relief valve 39 does not actually fully close from its open position 48 during the wide open throttle condition of the engine. That is, the force exerted by the fuel pressure at the pump-side port 44 plus the force generated by the fuel pressure at the rail-side port 46 never drops below the closure biasing force F of the valve 39, which as previously described is substantially near the necessary fuel idling pressure at the rail.

When the engine 23 is shut down, the injectors 26 stop cycling open and the pump stops. The pressure relief valve 39 remains in its open position 48 until the force exerted by the fuel pressure at the rail-side port 46 equals or is slightly less than the closure biasing force F of the pressure relief valve 39 at which point the valve moves to the closed position 42. This assumes the fuel pressure at the pump-side port 44 drops to substantially atmospheric pressure and the valve 39 is vented to the atmosphere.

Referring to FIGS. 3–6, the ports 44, 46 communicate with each other via an interposing cylindrical fuel chamber 50 defined generally between a body 78 of the valve 38 and a valve head or resilient diaphragm assembly 56 when the valve is in the open position 48. Preferably, the pressure relief valve 39 is passive and biased in the closed position 42 by a spring 54 having a known force and coefficient of compression or spring constant thus exerting a known force upon the diaphragm assembly 56 which sealably engages a valve seat 58.

Figure 6:
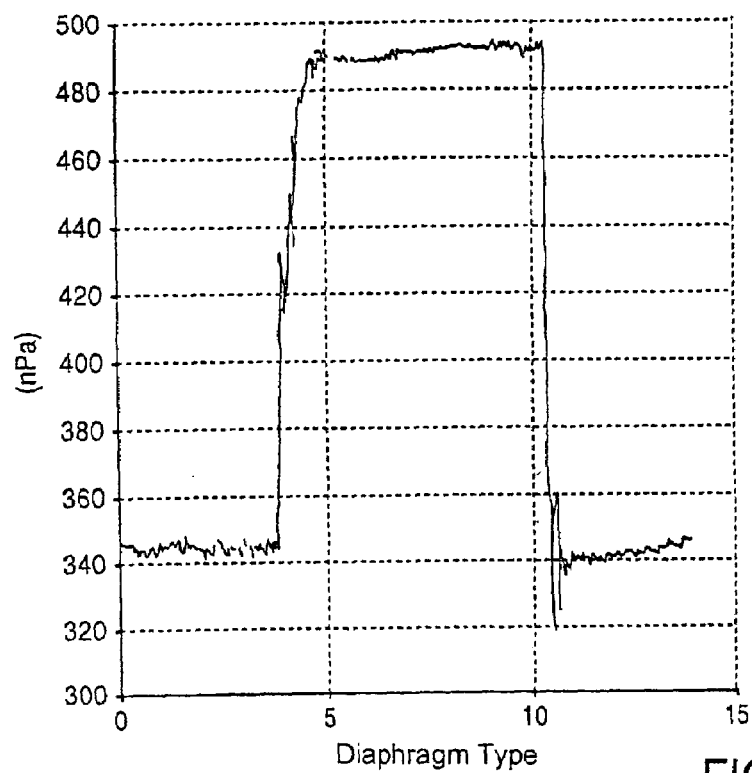
FIG. 6; is a graph of a fuel pressure transient within a fuel rail of the no-return loop fuel injection system utilizing a preferred diaphragm type pressure relief valve.
Figure 7:
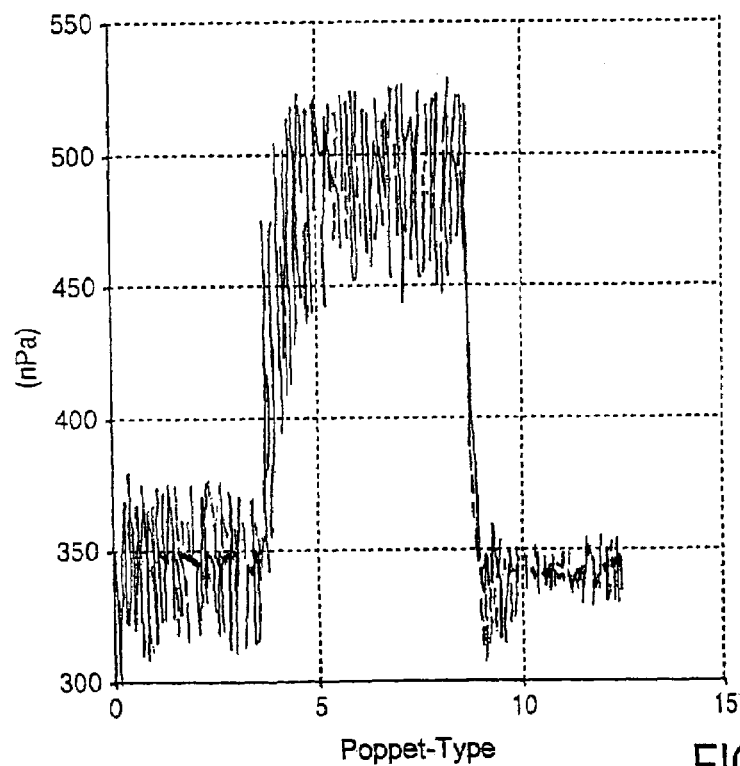
FIG. 7 is a graph of a fuel pressure transient within a fuel rail of a no-return loop fuel injection system utilizing a poppet-type pressure relief valve.
Figure 8:
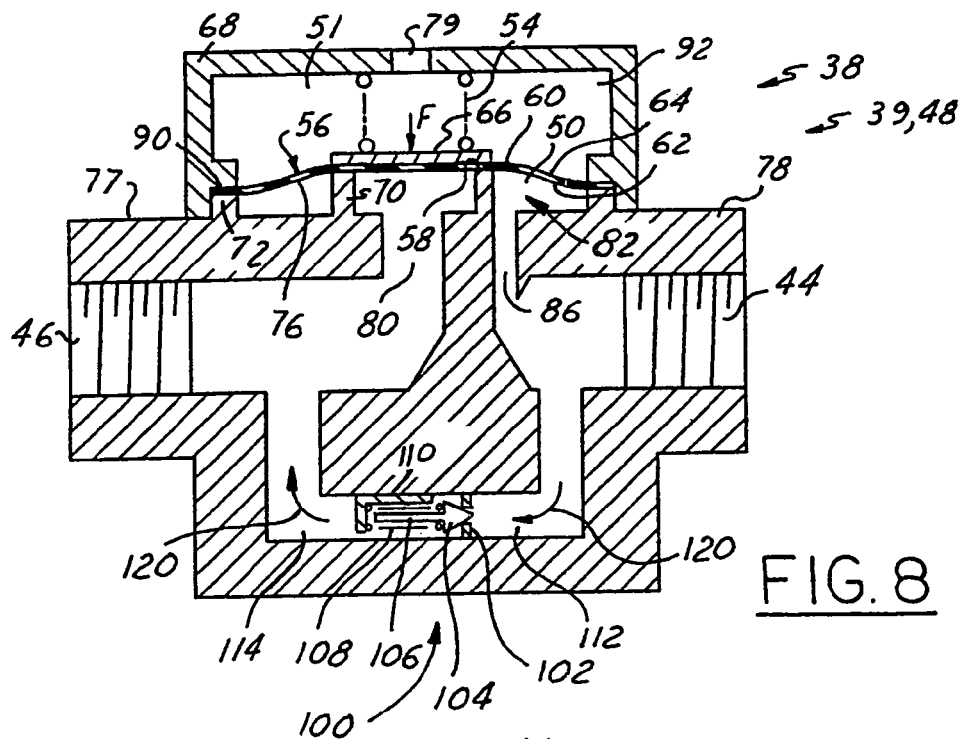
FIG. 8 is a semi-schematic cross section of a pressure valve assembly having a pressure relief valve similar to FIG. 5 except detailing an integral check valve.
Figure 9:
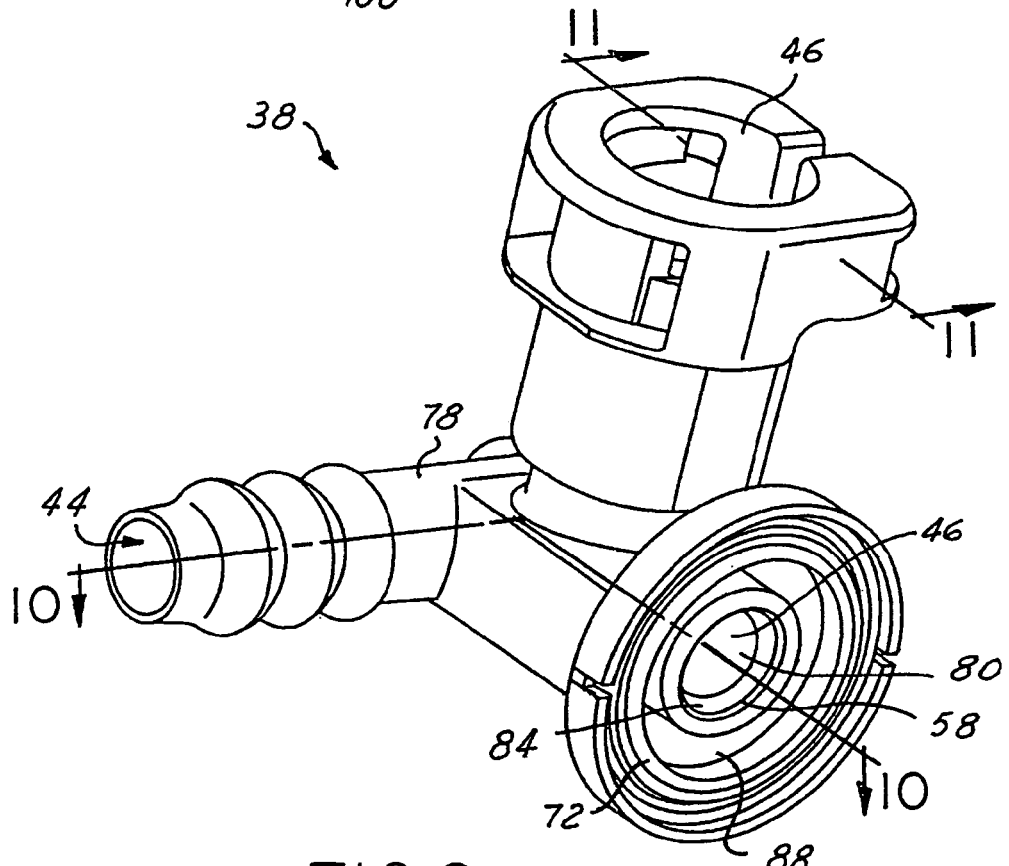
FIG. 9 is a perspective view of the pressure valve assembly of FIG. 8.

The valve head 56 may take the form of a poppet-type or ball bearing head. However, as shown in FIG. 7, poppet valves tend to oscillate excessively creating pressure spikes within the fuel rail which could degrade smooth running performance of an engine. In contrast, the performance of the preferred diaphragm type valve 38, as shown in FIG. 6, has a much smoother yet equally responsive performance curve. As opposed to poppet valve designs which are always moving, causing oscillations in fuel pressure at the rail, the diaphragm design dampens these transients creating a smoother running engine, with less noise and less wear.

The valve head 56 has a resilient diaphragm 60 having a fuel side 62 and a reference side 64. The fuel chamber 50 is defined between the valve body 78 which carries the ports 44, 46 and the fuel side 62 of the diaphragm 60, and a reference chamber 51 is defined between the reference side 64 of the diaphragm 60 and a housing 68. Preferably, a substantially rigid member or disk 66 is engaged to the reference side 64 of the diaphragm 60 to support the spring 54 which is received and compressed axially or biased between the valve housing 68 and the rigid disk 66 within the reference chamber 51. The spring 54 assures reliable seating of the diaphragm 60 against the valve seat 58.

The valve seat 58 is substantially annular in shape and is carried by the rim or distal end of an inner shoulder 70 projecting upward from a surface 77 of the valve body 78. An outer shoulder 72 is concentric to and disposed radially outward from the inner shoulder 70 and sealably engages both the housing 68 and a peripheral edge 90 of the diaphragm 60.

An inner orifice 80 carried by the surface 77 of the body 78 communicates between the fuel chamber 82, defined by the surface 77 and the fuel side 62 of the diaphragm 60, and the rail-side port 46. When the relief valve 39 is in the closed position 42, the inner orifice 80 communicates solely with a substantially cylindrical rail sub-chamber 84 of the fuel chamber 82 which is defined in part by a substantially circular first area or inner portion 74 of the fuel side 62 of the diaphragm 60 and a substantially circular portion of the surface 77 of the body 78 disposed radially inward from the inner shoulder 70. An outer orifice 86 carried by an annular portion of the surface 77 disposed radially between the shoulders 70, 72 of the body 78 communicates between a pump sub-chamber 88 of the fuel chamber 82 disposed radially outward from the rail sub-chamber 84 and segregated therefrom by the inner shoulder 70 or seat 58. The pump sub-chamber 88 is defined in-part by the substantially annular shaped second area or outer portion 76 of the fuel-side 62 of the diaphragm 60 and the annular portion of the surface 77 of the body disposed radially between the shoulders 70, 72.

For the valve 39 to open, the total hydraulic force exerted on the fuel-side 62 of the diaphragm 60 must be greater than the total closure biasing force F exerted on the reference side 64 which is substantially the spring force (produced by spring 54) plus that force generated by the air pressure within the reference chamber 51. Preferably, the reference chamber 51 is vented to atmosphere via the orifice 79 carried by the housing 68, so that the closure biasing force F is substantially the spring force alone. However, the reference chamber 51 can be vented to other areas such as the vacuum manifold, the fuel tank, or the inlet to the fuel pump to vary the pressure in chamber 51 which could potentially correlate the valve operation with varying dynamics of the engine.

Assuming the reference chamber 51 is vented to atmosphere and the engine 23 is shut off so that the pump-side port 44 is substantially at atmospheric pressure, the pressure relief valve 39 will remain in the normally closed position 42 unless the biasing force F is exceeded by the hydraulic force calculated generally as the residual fuel pressure within the fuel rail 28 or rail-side port 46 times the exposed or circular area 74. Once this hydraulic force exceeds the biasing force F, the valve 39 will initially crack open to relieve pressure until once again the hydraulic force decreases to slightly below the closure biasing force F.

During engine start-up, the pressure relief valve 39 will remain in its normally closed position 42 until the biasing force F is exceeded by the opposing hydraulic force which is generally calculated as the summation of the product of the residual pressure at rail-side port 46 times the area of the circular area 74 plus the product of the fuel pressure at the pump-side port 44 times the area of the annular area 76. Once the hydraulic force exceeds the biasing or spring force F, the valve 38 will initially open. The valve will then remain open provided the hydraulic pressure calculated as the fuel pressure within the fuel chamber 50 times the total area of the fuel side 62 of the diaphragm 60 remains in excess of the closure biasing force F.

During design, the size of inner area 74, or the ratio of area 74 over the total exposed area of diaphragm side 62 must be sized in comparison to the closure biasing force F so that the valve 38 will open if the rail pressure exceeds minimum idling pressure. Moreover, inner area 74 exposed generally to the rail-side port 46 is smaller than outer area 76 exposed generally to the pump-side port 44. This means during start-up of the engine 23, and after a long enough shutdown period so that residual pressure at the rail is near zero or atmospheric, it takes less pressure to open the valve 39 to supply fuel to the rail 28, than it takes to open the valve 39 to relieve residual pressure from the rail 28 flowing fuel back to the idle pump 22.

When the engine 23 is running at wide open throttle conditions, the cycling fuel injectors 26 can, for the sake of example, require a fuel rail pressure of 500 kPa. Should the operator suddenly decelerate, the fuel injectors 26 will shut-off and would trap fuel in the rail 28 at about 500 kPa, if it were not for valve 39 which remains open, when the engine injectors 26 actually want about 200 kPa for idling operation. Because the pressure relief valve 39 remains open, fuel from the rail 28 can reverse flow back through the pump 22 to immediately relieve or reduce the rail fuel pressure. This immediate reduction in fuel pressure at the rail enhances injector calibration by increasing the injector pulse width.

Figure 1:
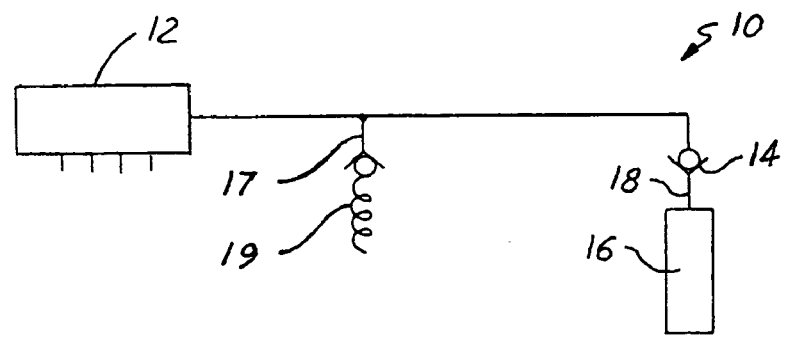
FIG. 1 is a schematic of a prior art, no-return-loop, "T" configuration, fuel injection system.

For a turbo-charged engine system operating under variable pressure conditions, required fuel rail pressure at wide open throttle can be five bars while desired engine idling pressure at the fuel rail is two and a half bars. Conventional, no-return loop, or even "T" configuration, fuel injection systems as shown in FIG. 1, require the pressure relief check valve 19 to actuate above five bars. In contrast, the pressure relief valve 39 of the no-return loop, "parallel" configuration, fuel injection system 20 requires a pressure relief valve 39 setting of only two and a half bars to flow fuel even in the relief or reverse direction. Therefore, when the engine 23 is shut down, fuel rail pressure immediately falls to two and a half bars as opposed to holding at five bars for the prior art system which would therefore be more prone to fuel leakage through the injectors and unwanted rich engine start scenarios. However, the pressure relief valve 39 of the present invention can replace the flow check valve 14 at the outlet 18 of the pump 16 of a conventional "T" configuration fuel injection system 10. With this application, the fuel rail of the "T" configuration system need not be exposed to high internal fuel pressures when the engine is shut down. This has the benefit of reducing the likelihood of injector fuel leakage.

In an ideal engine application, the pressure valve assembly 38 will operate sufficiently as previously described with only the pressure relief or control valve 39. However, in selected engine applications requiring a more robust design such as those exposed to extreme weather or temperature conditions which could significantly decrease battery voltage levels or cause vapor lock within the fuel rail 28 a check valve 100 is preferably integrated into the pressure valve assembly 38, as best illustrated in FIGS. 8–11. The check valve 100 is orientated to bypass the pressure relief valve 39 allowing fuel to flow from the pump-side port 44 to the rail-side port 46 when the fuel pump 22 is running at reduced output levels due to low voltage which does not produce sufficient pressure to open the pressure relief valve 39 or when the fuel pump 22 is not running and due to cold weather conditions a sub-atmospheric or vacuum pressure develops in the fuel rail 28.

Unlike the diaphragm-type pressure relief valve 39, the check valve 100 is preferably a poppet or ball-type valve having a compression spring 108 which produces a biasing force to hold the valve 100 normally closed. This biasing force is appreciably less than the biasing force of the compression spring 54 which holds the pressure relief valve 39 closed. For example, during start-up, if the engine 23 requires 200 kPa at the rail 28 to operate at idle, the pump is required to produce a fuel pressure substantially near 200 kPa (not differential pressure) against the annular second area 76 of the diaphragm assembly 60 to open the pressure relief valve 39. This assumes that the fuel rail pressure exposed to the first area 74 of the diaphragm 60 is substantially near atmospheric, as is the reference chamber 51 thus providing little or no assistance in opening the relief valve 39. In contrast, opening of the check valve 100 may require a differential pressure of only about 20 kPa to open. Thus, if the fuel rail pressure is at atmospheric, the flow check valve 100 will open when the fuel pressure in the pump-side channel 44 reaches 20 kPa. Consequently, even if the pressure relief valve 39 does not open, the fuel flow through the check valve 100 is sufficient to start the engine 23 during low voltage conditions, thus raising operating voltage levels, which then improves the output of the fuel pump 22 and raises fuel pressure levels to open the pressure relief valve 39 for continuing engine operation. Once the pressure relief valve 39 opens, the pressure in the fuel rail 28 increases to substantially the fuel pressure in the pump-side channel or port 44. The differential pressure across the check valve 100 thus falls below 20 kPa and the check valve 100 closes while the pressure relief valve 39 remains open.

During normal temperature engine start-up, when voltage levels are not significantly decreased and pump output is within normal range, fuel pressure within the pump-side channel 44 will quickly increase to the fuel pressure level needed for engine idling operation and opening of the pressure relief valve 39. During this brief pressure ramp-up period, the flow check valve 100 may briefly flutter open-and-closed but will not significantly contribute toward engine starting. Any fuel flow entering the fuel rail 28 via the fluttering check valve 100 will only contribute toward opening of the pressure relief valve 39 by raising fuel pressure within the fuel rail which in-turn exerts a positive pressure against the first area 74 of the fuel side 62 of the diaphragm 60.

The check valve 100 also prevents unwanted fuel vapor lock at the rail 28 during cooling weather and/or declining temperature conditions within the engine compartment which could hinder engine start-up, lead to rough idling of the engine 23, or simply induce a vacuum against the circular first area 74 of the diaphragm 60 making it more difficult for the pump 22 to open the pressure relief valve 39. For instance, when a hot idling engine is shut down there exists a hot soak period typically of five to ten minutes wherein external temperatures at the fuel rail 28 can further elevate due to residual heat emitted from surrounding heat sinks such as the exhaust manifold. This residual heat causes fuel temperature to rise even further within the fuel rail 28, the trapped fuel increases in pressure until the pressure relief valve 39 opens briefly to relieve excessive fuel rail pressure. After the soak period has expired and the engine cools, and especially if external weather temperatures should fall to cooler conditions, the pressure of the trapped fuel in the rail 28 could conceivably fall below atmospheric exerting a vacuum upon the tightly closed diaphragm 60 of the relief valve 39. When starting the engine under this condition, the vacuum pressure of the rail must be overcome by the fuel pump 22 before the pressure relief valve 39 will open. Moreover, the sub-atmospheric pressure within the rail 28 will lower the liquid-to-vapor transition point of the trapped fuel tending toward unwanted vapor lock.

Incorporating the check valve 100 into the pressure valve assembly 38 addresses the above mentioned issues with vacuum pressure development in the fuel rail 28. For instance, assuming the fuel pressure at the pump 22 and port 44 is atmospheric with the engine shuts down, if pressure within the rail 28 drops below a predetermined value, such as a negative 20 kPa as in the above example, the check valve 100 will open to expose the rail 28 to the atmospheric pressure of the port 44. Consequently, the pressure relief valve 39 is never exposed to a vacuum of greater than the predetermined value, or 20 kPa, and the fuel vapor transition point is never adversely effected to such a degree that it would cause vapor lock in the fuel rail 28.

Consequently and per the above discussed example, during engine start-up the fuel pump 22 must produce a fuel pressure in the port or channel 44 of slightly over 200 kPa to compensate for the slight vacuum in the fuel rail 28. More specifically, assuming the reference chamber 51 is exposed to atmospheric pressure and fluttering of the check valve 100 is insignificant, the force exerted upon the fuel side 62 of the diaphragm 60 must exceed the biasing force of the spring 54 exerted upon the reference side of the diaphragm to open the pressure relief valve 39. With a vacuum on the rail-side (minimized by the check valve 100) and because the pre-established force necessary to open the pressure relief valve 39 is generally calculated by: the product of the diaphragm area of the second or outer area 76 times the fuel pressure in the port 44, plus the product of the diaphragm area of the second or inner area 74 times the fuel pressure in the port 46 or fuel rail 28; the positive fuel pressure in port 44 must be elevated to compensate for the negative fuel pressure in port 46. This compensation of fuel pressure is also a function of the areas 74, 76.

Figure 10:
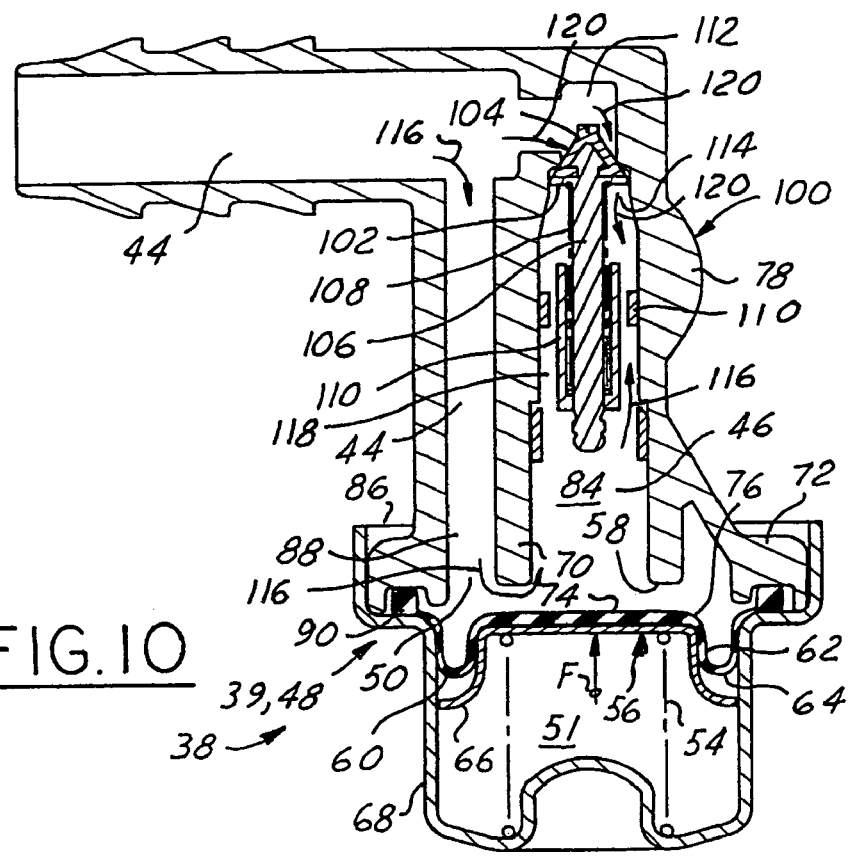
FIG. 10 is a cross section of the pressure valve assembly taken along line 10—10 of FIG. 9.
Figure 11:
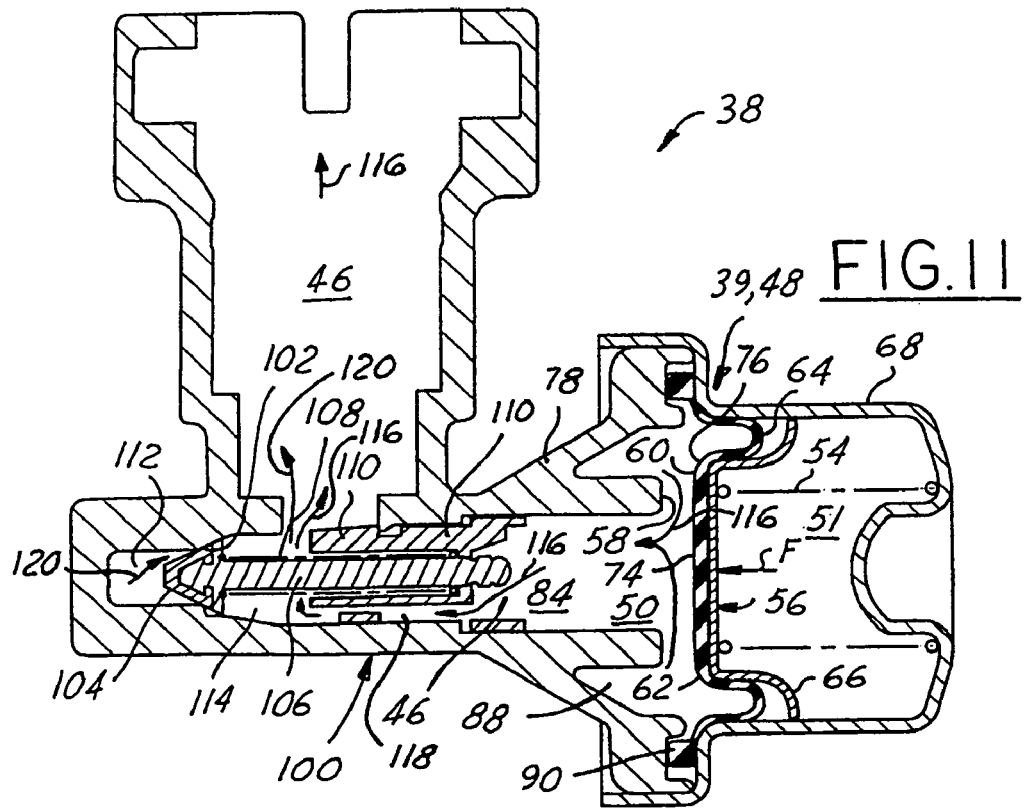
FIG. 11 is a cross section of the pressure valve assembly taken along line 11—11 of FIG. 9.

Referring to FIGS. 10 and 11, a generally annular valve seat 102 of the poppet check valve 100 is carried by the fuel resistant plastic body 78 of the pressure valve assembly 38. A metallic, forward tapered, enlarged head 104 of the check valve 100 is disposed concentrically at one end of an elongated metallic stem 106 and is held sealably against the seat 102 by the compression spring 108 which exerts a predetermined biasing force against a rearward annular surface of the head 104 to hold or bias the check valve 100 closed. The spring 108 is received about the stem 106 and is compressed axially between the enlarged head 104 and a body section 110 engaged rigidly to the body 78 of the pressure valve assembly 38 in the rail-side channel or port 46. The body 78 defines an inlet passage 112 which tees off of a mid-point of the pump-side channel 44 and leads to the valve head 104 and rearward facing seat 102. When the check valve 100 is open, an outlet passage 114 communicates with the inlet passage 112 and tees into a mid-point of the rail-side channel 46. The valve head 104 is generally disposed in the passages 112, 114 and the valve stem 106 projects from the head 104 well into the rail-side channel 46 and terminates short of the rail sub-chamber 84.

Referring to FIGS. 10 and 11, the check valve 100 is shown closed and the pressure relief valve 39 is in an open position 48, thus generally illustrating an engine starting, steady state running, or engine accelerating condition or configuration. In this configuration, fuel flows in the direction of arrows 116 through the L-shaped pump-side port 44 (not shown in FIG. 11), into the fuel chamber 50, then into the L-shaped rail-side port 46, flowing through voids 118 of the port 46 which are formed generally by the body section 110 and stem 106 of the flow check valve 100, then taking an approximate ninety degree bend to continue flowing through the port 46 (which turns into a direction outward from the page in FIG. 10 and upward in FIG. 11) to the fuel rail 28. As previously described, if the fuel rail 28 requires pressure relief, possibly during an abrupt deceleration, the pressure relief valve 39 remains open and fuel flow reverses flowing along the same path but in a direction opposite to arrow 116. When the pressure relief valve 39 is closed and the flow check valve 100 is open, fuel flows in the direction of arrow 120, partially along port 44, diverting into inlet passage 112, flowing past the unseated (not shown) head 104 into outlet passage 114, diverting into the ninety degree bend of port 46 and flowing (generally upward from the page) to the fuel rail 28. Unlike the pressure relief valve 39, the flow check valve 100 does not provide a reverse flow path.

Figure 12:
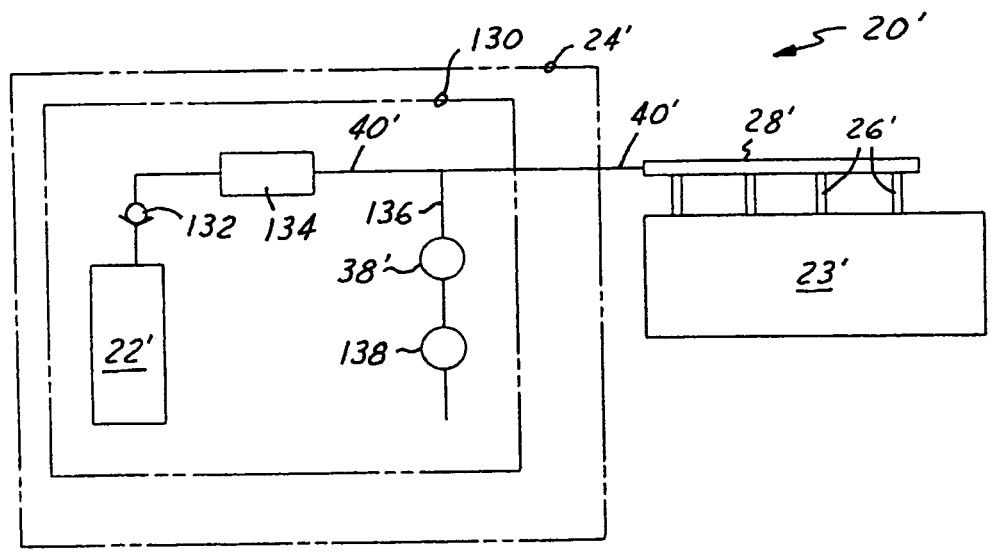
FIG. 12 is a schematic of a no-return loop fuel system utilizing a second aspect of a pressure valve assembly.
Figure 13:
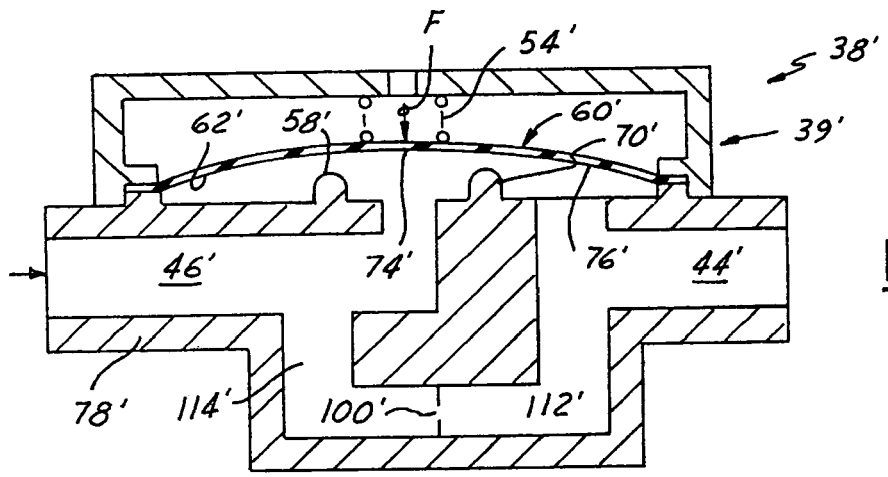
FIG. 13 is a cross section of the pressure valve assembly of FIG. 12 illustrated in an open position.
Figure 14:
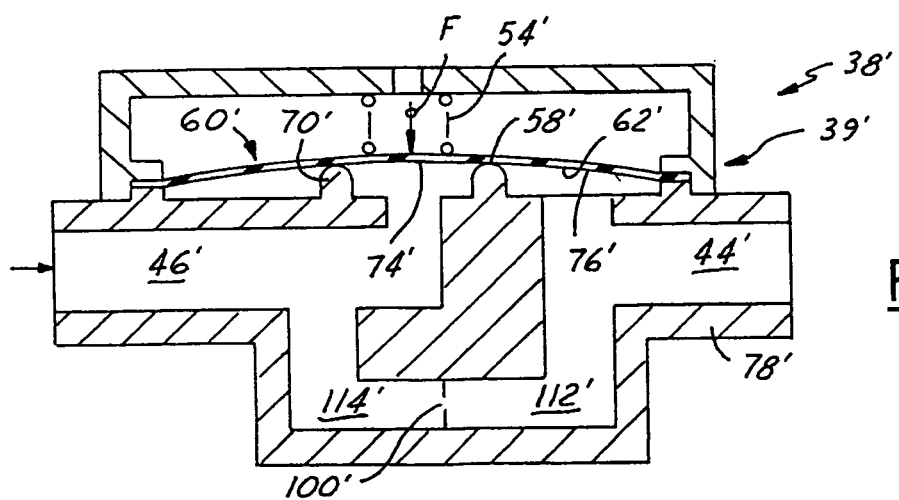
FIG. 14 is a cross section of the pressure valve assembly of FIG. 12 illustrated in a closed position.

FIGS. 12–14 illustrate another aspect of a no-return loop fuel system 20' having a fuel pump module 130 submerged inside a fuel tank 24'. A fuel pump 22' of the module 130 runs at a constant speed to supply fuel through a check valve 132, fuel filter 134, and a fuel line 40', to a fuel rail 28' and at least one fuel injector 26'. The module 130 preferably includes a bypass line 136 communicating downstream of the filter 134 with the fuel line 40'. With the pump 22' running at a constant speed, generally regardless of engine speed, a pressure regulator or pressure regulation valve 138 of the module 130 holds fuel pressure substantially constant at the fuel rail 28'. When open, the pressure regulation valve 138, located on the bypass line 136, diverts excess fuel from the fuel line 40' and fuel rail 28' back into the tank 24', thus maintaining fuel pressure at the rail 28' substantially at a predetermined operating pressure regardless of fuel flow through the injectors 26'.

Generally, with the engine 23' shut down, fuel pressure in the fuel line 40' and rail 28' will fall below operating pressure over a period of time. But, if for example, residual heat of the engine or environment should cause the trapped fuel to expand and increase fuel pressure beyond operating pressure, the normally biased closed pressure regulation valve 138 will fluctuate open relieving pressure by flowing fuel back to the tank 24'. Consequently, because fuel pressure at the rail 28' never exceeds operating pressures when the engine is shut down and is generally substantially less than operating pressure, fuel leakage through the injectors 26' is much less likely than if fuel were stored in the rail at pressures substantially higher than operating pressure.

When the engine is shut down over an extended period of time, the fuel pressure in the rail 28' will likely drop to atmospheric or relatively low pressure leading to partial vaporization which potentially causes rough or prolonged engine starts. To compensate, and eliminate the unwanted vapor during engine starts, a pressure valve assembly 38' preferably of the pump module 130 is located in the bypass line 136 upstream of the pressure regulation valve 138. The pressure valve assembly 38' has a pressure control valve 39', which is similar in structure to valve 39 previously described, and is biased normally closed causing the fuel pressure in the fuel line 40' to spike during engine starts thus condensing the vapor back into liquid form.

More specifically, when the engine 23' is running and the pump 22' is operating at constant speed, the normally biased closed pressure control valve 39' of the pressure valve assembly 38' will remain continuously open communicating the fuel pressure at the rail 28' to the regulator 138 via the bypass line 136 which regulates pressure to system operating pressure. The operating pressure exerts upon both a smaller first area 74' and larger second area 76' of a fuel side 62' of a diaphragm 60' of the pressure control valve 39'. The combined areas times the substantially uniform operating pressure across the areas 74', 76' produces a force on the diaphragm sufficient to overcome the closure biasing force of an opposing compression spring 54', thus keeping the valve 39' continuously open allowing the regulator 138 to control system pressure.

When the engine 23' is initially shut down, the pressure control valve 39' remains open and the regulator 138 continues to control and prevent fuel pressure from exceeding system operating pressure, thus compensating for possible fuel expansion. Over an extended period of time, fuel pressure in the system 20' will fall below a closing pressure setpoint of the pressure control valve 39', which is less than the system operating pressure, and the closure biasing force of the spring 54' will overcome the opposing force created by fuel pressure, thus closing the valve 39' and substantially isolating the regulator 138.

Over an even greater period of time with the engine 23' shut down and the pressure control valve 39' closed, the system 20' pressure will generally approach atmospheric pressure on both the inlet and outlet sides of the pressure valve assembly 38'. The lower fuel pressure is desired to eliminate the potential of fuel leakage at the injectors 26', but may also cause unwanted vaporization in the fuel line 40' and fuel rail 28'. Without removal, this vapor can cause rough or prolonged starting of the engine 23'.

However, during starting of the engine utilizing the fuel system 20' of the present invention, the pressure control valve 39' will not immediately open, and thus the regulator 138 will not immediately regulate to system operating pressure. Instead, the fuel pressure in the fuel line 40' and thus an inlet port 46' of the pressure valve assembly 38' will briefly increase or spike to an opening threshold pressure of at least twice that of the system operating pressure. For instance, in a fuel system having a system operating pressure of about 300 kPa, the pressure control valve 39' will not open until the smaller first area 74' is exposed to a peak or opening threshold pressure of about 800 kPa, wherein this pressure substantially creates the force against the first area 74' necessary to overcome the spring biasing force. This assumes the pressure on the regulator side at outlet port 44' of the pressure valve assembly 38', and thus exposed to the larger second area 76', is substantially atmospheric and contributes little to the opening force. At a peak pressure of 800 kPa, any vapor in the fuel line 40' and rail 28' condenses back into liquid form providing a smooth and quick start of the engine 23'.

At the moment of engine start or immediately after, the pressure control valve 39' will open due to the pressure spike. The fuel pressure at the fuel line 40' and rail 28' will then abruptly fall to system operating pressure because the regulator 138 immediately opens when exposed to the high fuel line 40' pressure, via the open pressure control valve 39' and bypass line 136. Once system operating pressure is reached, the regulator 138 intermittently opens and closes to maintain pressure at about 300 kPa. During the fall of fuel pressure from 800 kPa to 300 kPa, and even during the period that the regulator 138 maintains system operating pressure at about 300 kPa, the pressure control valve 39' remains open since the larger second area 76' of the fuel side 62' of the diaphragm 60' downstream of the valve seat 58' is also exposed to the system operating pressure adding to the opening force exerted on the first area 74' which together overcome the biasing closure force F of the valve 39'.

When the engine is shut down, as long as the regulator 138 maintains approximately 300 kPa, or system operating pressure, the pressure control valve 39' will remain open. If the engine is "hot-started" generally soon after the engine was shutdown, vapor will not yet have accumulated in the system and the fuel pressure in the fuel line 40' will not spike above operating pressure because the pressure control valve 39' will still be open. But, if the engine remains shutdown, the fuel line 40' pressure will in-time fall below the closing pressure setpoint of the pressure control valve 39' and the valve will close as previously described.

Preferably, the pressure valve assembly 38' has a very small or pin-hole orifice 100' which generally replaces the previously described check valve 100 and provides pressure relief above system operating pressure for the fuel line and rail 40', 28' caused by fuel expansion when the engine is shutdown and the pressure control valve 39' has prematurely closed during the thermal soak period. The orifice 100' is orientated to bypass the closed pressure relief valve 39' allowing a minimal rate of fuel flow from the inlet port 46' to the outlet port 44' when the regulator 138 has subsequently opened. As previously described, maintaining system fuel pressure at or below operating pressure (i.e. 300 kPa) reduces any opportunity of fuel leakage through the injectors 26' when the engine 23' is shutdown.

The size of orifice 100' is sufficiently small, generally on the order of microns, to limit bypass fuel flow around the closed pressure control valve 39' when the engine is started. The pump 22' is sufficiently sized to produce a spiking pressure (i.e. 800 kPa) to initially open the valve 39' with the presence of the orifice 100'. Moreover, the orifice 100' is sufficiently large so that particulate suspended in the fuel does not plug it. Usually the orifice 100' has a hole diameter of about one to five thousandths of an inch.

The body 78' of the pressure valve assembly 38' defines the orifice 100' which preferably communicates between a downstream passage 112' which tees off of a mid-point of the channel or port 44' and an upstream passage 114' which tees into a mid-point of the channel or port 46'. Alternatively, the orifice 100' can be located through the inner shoulder 70' which carries the valve seat 58' of the pressure control valve 39'.

While the forms of the invention herein disclosed constitute presently preferred embodiments, many others are possible. For instance, the pressure relief valve can be replaced with a servo or pneumatic controlled valve which operates via the controller and pressure signals received from the transducer at the rail and an additional transducer positioned at the outlet of the fuel pump. It is not intended herein to mention all the possible equivalent forms or ramification of the invention. It is understood that terms used herein are merely descriptive, rather than limiting, and that various changes may be made without departing from the spirit or scope of the invention.

We claim:

1. A pressure valve assembly for a no-return loop fuel delivery system having a fuel injector for operatively flowing fuel into a combustion engine and a fuel pump for flowing pressurized fuel to the injector through the pressure valve assembly, the pressure valve assembly comprising:
   a body;
   a pump-side port carried by the body;
   an engine-side port carried by the body, the pump-side port being positioned between the fuel pump and the engine-side port, and the engine-side port being positioned between the pump-side port and the fuel injector;
   a circumferentially continuous valve seat carried by the body and disposed between the engine-side and pump-side ports; and
   a valve head having a diaphragm biased sealingly against the valve seat when the valve assembly is in a closed position, the valve head diaphragm has a first area exposed to the pump-side port and a second area separated from the first area by the valve seat and exposed to the engine-side port while the valve head diaphragm is sealed on the valve seat.

2. The pressure valve assembly set forth in claim 1 wherein the valve head is biased against the valve seat by a spring.

3. The pressure valve assembly set forth in claim 1 comprising:
   a housing carried by the body; and
   a reference chamber defined between the valve head and the housing, the reference chamber being isolated from the engine-side and pump-side ports regardless of whether the valve assembly is in the closed or an open position.

4. The pressure valve assembly set forth in claim 3 wherein the valve head has a resilient diaphragm having a peripheral edge engaged sealably to the body.

5. The pressure valve assembly set forth in claim 4 comprising:
a fuel chamber defined between the body and the diaphragm; and
the engine-side port communicates with the pump-side port via the fuel chamber when the pressure valve assembly is in the open position, and the diaphragm obstructs communication between the engine-side port and the pump-side port at the fuel chamber when the valve is in the closed position.

6. The pressure valve assembly set forth in claim 5 comprising a spring disposed within the reference chamber and compressed resiliently between the diaphragm and the housing.

7. The pressure valve assembly set forth in claim 6 wherein the reference chamber is vented to atmospheric pressure.

8. A no-return loop fuel delivery system for a combustion engine comprising:
a fuel injector for injecting fuel into the combustion engine;
a fuel rail communicating with the fuel injector;
a fuel pump for delivering fuel to the fuel rail and fuel injector;
a pressure control valve constructed and arranged to flow fuel between the fuel rail and the fuel pump, the pressure control valve having a pump-side port, a rail-side port, an open position, a closed position, and a closure biasing force, the pump-side port being positioned between the fuel pump and the rail-side port, and the rail-side port being positioned between the pump-side port and the fuel rail;
the pressure control valve while closed having a diaphragm with a first area which communicates with the pump-side port and not the rail-side port and a second area which communicates with the rail-side port and not the pump-side port and while open both the first and second areas communicate with both the pump-side port and the rail-side port;
the pressure control valve moves from the closed position to the open position to flow fuel from the fuel pump through the ports and to the fuel rail when the closure biasing force is exceeded by an opposing hydraulic force generated by fuel pressure; and
the pressure control valve is the open position to flow fuel from the fuel rail through the ports and back through the fuel pump when the closure biasing force is exceeded by the opposing hydraulic force generated by fuel pressure.

9. The no-return loop fuel delivery system set forth in claim 8 which has no one-way flow check valve.

10. The no-return loop fuel delivery system set forth in claim 8 wherein the fuel pump is a variable speed fuel pump.

11. The no-return loop fuel delivery system set forth in claim 10 comprising:
a pressure transducer for measuring fuel pressure within the fuel rail assembly; and
a controller for receiving and processing a pressure signal from the pressure transducer and sending a speed command signal to the variable speed fuel pump.

12. The no-return loop fuel delivery system set forth in claim 8 wherein the pressure control valve comprises:
a body;
a resilient diaphragm having a peripheral edge engaged sealably to the body;
a fuel chamber defined between the body and the diaphragm;
a rail-side port carried by the body and communicating with the fuel chamber;
a pump-side port carried by the body and communicating with the chamber; and
the rail-side port communicates with the pump-side port via the fuel chamber when the pressure control valve is in the open position, and the diaphragm obstructs communication between the rail-side port and the pump-side port via the fuel chamber when the pressure control valve is in the closed position.

13. The no-return loop fuel delivery system set forth in claim 12 comprising:
a housing engaged sealably to the peripheral edge of the diaphragm and the body;
a reference chamber defined between the housing and a reference side of the diaphragm; and
the fuel chamber is defined between an opposite fuel side of the diaphragm and the body.

14. The no-return loop fuel delivery system set forth in claim 13 comprising:
a valve seat exposed within the fuel chamber and seated sealably against the fuel side of the diaphragm when the pressure control valve is in the closed position;
the fuel side of the diaphragm has a first area and a second area;
a pump sub-chamber of the fuel chamber defined between the body and the first area of the diaphragm; and
a rail sub-chamber of the fuel chamber defined between the body and the second area of the diaphragm, and the rail sub-chamber is isolated from the pump sub-chamber when the diaphragm sealably contacts the valve seat.

15. The no-return loop fuel delivery system set forth in claim 14 wherein the reference chamber is vented to atmospheric pressure.

16. The no-return loop fuel delivery system set forth in claim 14 wherein the valve seat is annular in shape and the rail sub-chamber is disposed radially inward of the valve seat.

17. The no-return loop fuel delivery system set forth in claim 16 wherein the body has a cylindrical shoulder disposed within the fuel chamber and carrying the annular valve seat.

18. A pressure valve assembly for a no-return loop fuel delivery system having a fuel injector for operatively flowing fuel into a combustion engine and a fuel pump for flowing pressurized fuel to the injector through the pressure valve assembly, the pressure valve assembly comprising;
a body;
a pressure relief valve carried by the body and yieldably biased toward a closed position;
a flow check valve carried by the body and orientated in a parallel flow configuration with the pressure relief valve;
a pump-side channel defined by the body and communicating with the pump;
an engine-side channel defined by the body and communicating between the fuel injector and the pump-side channel when the pressure relief valve is open;

the fuel injector communicates with the pump via the communication of the pump-side channel with the engine-side channel when the pressure relief valve is open;

an inlet passage defined by the body and communicating with the pump;

an outlet passage defined by the body and communicating with the fuel injector;

the fuel injector communicates with the pump via the communication of the inlet passage with the outlet passage when the flow check valve is open;

a continuous valve seat of the pressure relief valve carried by the body and disposed between the engine-side and pump-side channels;

a valve head of the pressure relief valve having a fuel side biased sealingly against the valve seat when the pressure relief valve is in a closed position and a reference side exposed to atmospheric pressure, while in the closed position the fuel side having a first area exposed to the pump-side channel and a separate second area exposed to the engine-side channel; and the pressure relief valve moves from the closed position to an open position when a predetermined force is exceeded which is generally the product of the area of the first area times the fuel pressure within the rail-side channel plus the product of the area of the second area times fuel pressure within the pump-side channel.

19. The pressure valve assembly set forth in claim 18 wherein the flow check valve is constructed and arranged to open when fuel pressure in the inlet passage exceeds fuel pressure in the outlet passage by a predetermined pressure differential.

20. The pressure valve assembly set forth in claim 19 wherein the predetermined pressure differential of the flow check valve is substantially less than a predetermined pressure exposed at the second area of the fuel side of the valve head of the pressure relief valve and the reference side of the valve head of the pressure relief valve is exposed to atmospheric pressure.

21. The pressure valve assembly set forth in claim 20 wherein the head of the pressure relief valve has a diaphragm which carries the fuel and reference sides.

22. The pressure valve assembly set forth in claim 21 wherein the pressure relief valve and the flow check valve are each biased closed by compression springs.

23. The pressure valve assembly set forth in claim 20 wherein the fuel pressure needed to open the pressure relief valve and exerted upon the second area of the fuel side of the valve head is substantially near the pre-determined operating pressure of the fuel injector when the engine is operating at idle conditions and the initial reference pressure, and the initial fuel pressure at the injector, are at atmospheric pressure.

24. The pressure valve assembly set forth in claim 22 wherein the flow check valve is a poppet valve.

25. The pressure valve assembly set forth in claim 22 wherein the flow check valve is a ball valve.

26. A no-return loop fuel delivery system for a combustion engine comprising:

a fuel rail connected to a fuel injector for injecting fuel into the combustion engine;

a variable speed fuel pump for supplying fuel to the fuel rail and fuel injector;

a pressure relief valve having a valve head having a reference side exposed to a reference pressure and a fuel side having a first area exposed to the fuel rail and a second area exposed to the fuel pump when the pressure relief valve is in a closed position;

the pressure relief valve moves to an open position for flowing fuel in either direction between the fuel pump and the fuel rail when the fuel pressure exposed to the second area of the fuel side of the valve head exceeds slightly less than the operating fuel idle pressure of the engine when the pressure relief valve is closed and the reference side is exposed to reference pressure and the fuel pressure in the fuel rail is at substantially near the reference pressure;

a flow check valve yieldably biased toward a closed position and orientated between the fuel rail and the fuel pump for bypassing fuel flow around the pressure relief valve; and the check valve is constructed and arranged to open when fuel pressure at the fuel pump exceeds fuel pressure at the fuel rail by a predetermined pressure differential.

27. The no-return loop fuel delivery system set forth in claim 26 comprising:

a resilient diaphragm of the valve head of the pressure relief valve having the fuel side and reference side; and a compression spring bearing on the reference side for biasing the pressure relief valve toward the closed position.

28. The no-return loop fuel delivery system set forth in claim 27 wherein the check valve is a spring biased poppet valve.

29. The no-return loop fuel delivery system set forth in claim 28 wherein the pressure relief valve will move from the closed position to an open position when a predetermined force exerted by the spring of the pressure relief valve plus the product of the area of the reference side times the reference pressure, is exceeded by the product of the area of the first area times fuel pressure at the rail plus the product of the area of the second area times fuel pressure at the pump.

30. The no-return loop fuel delivery system set forth in claim 29 wherein the predetermined pressure differential of the check valve is substantially less than a predetermined pressure differential across the second area of the fuel side of the diaphragm and the reference side of the diaphragm.

31. The no-return loop fuel delivery system set forth in claim 29 wherein the pressure differential across the second area of the fuel side of the diaphragm and the reference side of the diaphragm is substantially near the operating pressure of the fuel injector when the engine is operating at idle conditions.

32. The no-return loop fuel delivery system set forth in claim 17 comprising a flow check valve orientated in a parallel flow configuration with the pressure control valve for flowing fuel from the fuel pump to the fuel rail when a predetermined fuel pressure differential across the flow control valve is reached and the pressure control valve is in the closed position.

33. A no-return loop fuel delivery system for a combustion engine comprising:

a fuel rail having a fuel injector for injecting fuel into the combustion engine;

a fuel pump;

a pressure regulator valve constructed and arranged to flow fuel between the fuel rail and the fuel pump, the pressure regulator valve having a pump-side port, a rail-side port, an open position, a closed position, and a closure biasing force, the pump-side port being positioned between the fuel pump and the rail-side port, and the rail-side port being positioned between the pump-side port and the fuel rail;

the pressure regulator valve while closed having a first area communicating with the pump-side port and not the rail-side port and a second area communicating with the rail-side port and not the pump-side port;

the pressure regulator valve moves from the closed position to the open position to flow fuel from the fuel pump through the ports and to the fuel rail when the closure biasing force is exceeded by an opposing hydraulic force produced by fuel pressure;

the pressure regulator valve moves from the closed position to the open position to flow fuel from the fuel rail through the ports and back through the fuel pump when the closure biasing force is exceeded by the opposing hydraulic force produced by fuel pressure; and a one-way flow check valve is not constructed and arranged to operate in the fuel delivery system.

34. The no-return loop fuel delivery system set forth in claim 33 wherein the fuel pump is a variable speed fuel pump.

35. The no-return loop fuel delivery system set forth in claim 34 comprising:
a pressure transducer for measuring fuel pressure within the fuel rail assembly; and
a controller for receiving and processing a pressure signal from the pressure transducer and sending a speed command signal to the variable speed fuel pump.

36. The no-return loop fuel delivery system set forth in claim 33 wherein the pressure regulator valve is of a diaphragm-type.

37. The no-return loop fuel delivery system set forth in claim 36 wherein the pressure regulator valve comprises:
a body;
a resilient diaphragm having a peripheral edge engaged sealably to the body;
a fuel chamber defined between the body and the diaphragm;
a rail-side port carried by the body and communicating with the fuel chamber;
a pump-side port carried by the body and communicating with the chamber; and
the rail-side port communicates with the pump-side port when the regulator valve is in the open position, and the diaphragm obstructs communication between the rail-side port and the pump-side port within the fuel chamber when the valve is in the closed position.

38. The no-return loop fuel delivery system set forth in claim 37 comprising:
a housing engaged sealably to the peripheral edge of the diaphragm and the body;
a reference chamber defined between the housing and a reference side of the diaphragm; and
the fuel chamber is defined between an opposite fuel side of the diaphragm and the body.

39. The no-return loop fuel delivery system set forth in claim 38 comprising:
a spring disposed within the reference chamber and compressed resiliently between the diaphragm and the housing; and
the closure biasing force is the force of the spring plus the product of the reference chamber pressure times the area of the exposed reference side of the diaphragm.

40. The no-return loop fuel delivery system set forth in claim 39 comprising:

a valve seat exposed within the fuel chamber and seated sealably against the fuel side of the diaphragm when the pressure regulator valve is in the, closed position;
the fuel side of the diaphragm having a first area and a second area;
a pump sub-chamber of the fuel chamber defined between the body and the second area of the diaphragm; and
a rail sub-chamber of the fuel chamber defined between the body and the first area of the diaphragm, and the rail sub-chamber is isolated from the pump sub-chamber when the valve seat is engaged to the diaphragm.

41. The no-return loop fuel delivery system set forth in claim 40 wherein the reference chamber is vented to atmospheric pressure.

42. The no-return loop fuel delivery system set forth in claim 40 wherein the second area is larger than the first area.

43. The no-return loop fuel delivery system set forth in claim 40 wherein the valve seat is annular in shape and the rail sub-chamber is disposed radially inward of the valve seat.

44. The no-return loop fuel delivery system set forth in claim 43 wherein the body has a cylindrical shoulder disposed within the fuel chamber and carrying the annular valve seat.

45. A pressure regulator valve for a no-return loop fuel delivery system having a fuel injector for operatively flowing fuel into a combustion engine and a fuel pump for flowing pressurized fuel to the injector through the pressure regulator valve, the pressure regulator valve comprising:
a body;
a pump-side port carried by the body;
an engine-side port carried by the body, the pump-side port is positioned between the fuel pump and the engine-side port, and the engine-side port is positioned between the pump-side port and the fuel injector;
a continuous valve seat carried by the body and disposed between the engine-side and pump-side ports;
a valve head diaphragm biased sealingly against the continuous valve seat when the valve is in a closed position thereby isolating the engine-side port from the pump-side port, so that the valve head diaphragm has a first area exposed to the pump-side port and not the engine-side port and a separate second area exposed to the engine-side port and not the pump-side port;
a housing carried by the body; and
a reference chamber defined at least in part by the valve head and the housing, the reference chamber being isolated from the engine-side and pump-side ports regardless of whether the valve is in the closed or open position.

46. The pressure regulator valve set forth in claim 45 wherein the valve head is biased against the valve seat by a spring.

47. The pressure regulator valve set forth in claim 45 wherein the valve head has a resilient diaphragm having a peripheral edge engaged sealably to the body.

48. The pressure regulator valve set forth in claim 47 comprising:
a fuel chamber defined between the body and the diaphragm; and
the engine-side port communicates with the pump-side port via the fuel chamber when the regulator valve is in the open position, and the diaphragm obstructs communication between the engine-side port and the pump-side port within the fuel chamber when the valve is in the closed position.

49. The pressure regulator valve set forth in claim 48 comprising a spring disposed within the reference chamber and compressed resiliently between the diaphragm and the housing.

50. The pressure regulator valve set forth in claim 40 wherein the reference chamber is vented to atmospheric pressure.

51. A pressure control valve for a fuel delivery system having a fuel injector for operatively flowing fuel into a combustion engine, a bypass fuel pressure regulator for controlling the pressure of fuel supplied to the fuel injector during normal operation of the engine, and a fuel pump for flowing pressurized fuel to the pressure control valve, the bypass fuel pressure regulator and the fuel injector, the pressure control valve comprising:
 a body;
 a first port carried by the body and constructed to communicate with the fuel pump and the fuel injector;
 a second port carried by the body downstream of the first port and constructed to communicate with a fuel inlet of the bypass fuel pressure regulator;
 a continuous valve seat carried by the body and disposed between the first and second ports; and
 a valve head biased sealingly against the valve seat when the pressure control valve is closed so that the valve head has a first area exposed to the first port and defined by the valve seat when the valve is closed and a separate second area exposed to the second port and defined by the valve seat when the valve is closed and the first port communicates with the second port when the valve is open.

52. The pressure control valve set forth in claim 51 comprising:
 a first side of the valve head exposed to a reference pressure;
 an opposite second side of the valve head carrying the first and second areas; and
 a peripheral edge of the valve head engaged sealingly to the body.

53. The pressure control valve set forth in claim 52 wherein the valve head is a resilient diaphragm.

54. The pressure control valve set forth in claim 53 wherein the second area is defined radially between the first area and the peripheral edge.

55. A pressure valve assembly for a fuel delivery system having a fuel injector for operatively flowing fuel into a combustion engine, a bypass fuel pressure regulator for controlling the pressure of fuel supplied to the fuel injector during normal engine operation, and a fuel pump for flowing pressurized fuel to the pressure valve assembly, bypass fuel pressure regulator and fuel injector, the pressure valve assembly comprising:
 a body;
 a first channel carried by the body and constructed to communicate with the fuel pump and the fuel injector;
 a second channel carried by the body and constructed to communicate with a fuel inlet of the bypass fuel pressure regulator;
 a circumferentially continuous valve seat carried by the body and disposed between the first and second channels;
 a valve head diaphragm having a first side exposed to a reference pressure and an opposite second side yieldably biased sealably against the circumferentially continuous valve seat when the pressure control valve is closed;
 a first area of the second side exposed to the first channel and defined by the valve seat when the valve is closed;
 a second area of the second side exposed to the second channel and defined by the valve seat when the valve is closed; and
 wherein the first channel communicates with the second channel when the valve is open.

56. The pressure valve assembly set forth in claim 55 wherein the first area is smaller than the second area.

57. The pressure valve assembly set forth in claim 55 comprising a peripheral edge of the valve head engaged sealably to the body.

58. The pressure valve assembly set forth in claim 57 wherein the valve head is a resilient diaphragm.

59. The pressure valve assembly set forth in claim 58 wherein the second area is defined radially between the first area and the peripheral edge.

60. The pressure valve assembly set forth in claim 56 comprising a check valve carried by the body and in a parallel flow configuration with a pressure control valve having the valve seat and the valve head.

61. The pressure valve assembly set forth in claim 60 wherein the pressure control valve and the check valve are biased closed and a force required to open the check valve for fuel flow in a first direction is less than a force exerted upon the first area and required to open the pressure control valve for fuel flow in the first direction, and when the second channel is substantially at reference pressure.

62. The pressure valve assembly set forth in claim 55 comprising a bypass orifice carried by the body and in a parallel flow configuration with a pressure control valve having the valve seat and valve head.

63. A fuel pump module of a no-return loop fuel system delivering fuel to a fuel injector for operatively flowing fuel into a combustion engine, the fuel pump module comprising:
 a fuel pump for delivering fuel to the fuel injector
 a fuel pressure regulator for regulating the pressure of fuel supplied by the fuel pump to the fuel injector during normal operation of the engine; and
 a pressure control valve having;
  a body;
  a first port carried by the body and communicating with the fuel pump and the fuel injector,
  a second port carried by the body and communicating with the fuel pressure regulator,
  a continuous valve seat carried by the body and disposed between the first and second ports,
  a valve head diaphragm having a first side exposed to a reference pressure and an opposite second side yieldably biased sealably against the continuous valve seat when the pressure control valve is closed,
  a first area of the second side exposed to the first port and defined by the continuous valve seat when the pressure control valve is closed, and
  a separate second area of the second side exposed to the second port and defined by the continuous valve seat when the pressure control valve is closed and the first port communicates with the second port when the valve is open.

64. The fuel pump module set forth in claim 63 comprising:
 the fuel pump being a variable speed type;
 the pressure control valve interposing the fuel line;
 the first port being an injector rail-side port; and the second port being a pump-side port.

65. The fuel pump module set forth in claim 64 comprising a check valve in parallel across the pressure control valve for flowing fuel from the fuel pump to the fuel injector when the pressure control valve is closed.

66. The fuel pump module set forth in claim 65 wherein the fuel line located between the fuel pump and the pressure control valve has no check valve.

67. The fuel pump module set forth in claim 63 comprising:
- a bypass line carried by the body and communicating with the fuel line;
- a regulator in the bypass line; and
- the pressure control valve being located in the bypass line between the fuel line and the regulator valve, and the first port communicates continuously with the fuel line and the second port communicates continuously with the regulator.

68. The fuel pump module set forth in claim 63 wherein the regulator is biased closed and opens at slightly higher than system operating pressure.

69. The fuel pump module set forth in claim 68 wherein the pressure control valve is normally biased closed and generally opens upon a fuel pressure exerted upon the first area which is substantially greater than system operating pressure.

70. The fuel pump module set forth in claim 69 wherein the pressure control valve when open remains open provided the fuel pressure exerted upon the first and second areas is greater than a pressure which is less than system operating pressure.

71. The fuel pump module set forth in claim 67 wherein the fuel pump is of a constant speed type.

72. The fuel pump module set forth in claim 71 comprising a check valve in the fuel line upstream of the bypass line.

73. The fuel pump module set forth in claim 71 comprising an orifice carried by the body for bypassing fuel around the pressure control valve when the pressure control valve is closed.

* * * * *

UNITED STATES PATENT AND TRADEMARK OFFICE
CERTIFICATE OF CORRECTION

| | | |
|---|---|---|
| PATENT NO. | : 7,188,610 B2 | Page 1 of 1 |
| APPLICATION NO. | : 10/946953 | |
| DATED | : March 13, 2007 | |
| INVENTOR(S) | : Lynwood F. Crary et al. | |

It is certified that error appears in the above-identified patent and that said Letters Patent is hereby corrected as shown below:

Column 21
  Line 5, delete "claim 40" and insert --claim 49--.

Column 23
  Line 18, delete "claim 63" and insert --claim 67--.

Signed and Sealed this

Third Day of July, 2007

JON W. DUDAS
*Director of the United States Patent and Trademark Office*